(12) United States Patent
Baba

(10) Patent No.: US 8,288,989 B2
(45) Date of Patent: Oct. 16, 2012

(54) METHOD AND SYSTEM FOR MANAGING CHARGE OF AUTOMATED GUIDED VEHICLE

(75) Inventor: Hiroyoshi Baba, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 317 days.

(21) Appl. No.: 12/864,601

(22) PCT Filed: Dec. 15, 2008

(86) PCT No.: PCT/JP2008/072784
§ 371 (c)(1),
(2), (4) Date: Jul. 26, 2010

(87) PCT Pub. No.: WO2009/096103
PCT Pub. Date: Aug. 6, 2009

(65) Prior Publication Data
US 2010/0308769 A1    Dec. 9, 2010

(30) Foreign Application Priority Data
Jan. 31, 2008   (JP) ................... 2008-021430

(51) Int. Cl.
| | |
|---|---|
| *H02J 7/00* | (2006.01) |
| *B60W 10/24* | (2006.01) |
| *B60W 20/00* | (2006.01) |
| *E04H 6/00* | (2006.01) |
| *B65G 1/00* | (2006.01) |

(52) U.S. Cl. ............ 320/109; 180/65.29; 414/227; 414/231; 414/236; 414/253; 414/261; 414/266; 414/268; 414/269; 414/273; 414/274

(58) Field of Classification Search ............ 320/109; 180/65.29; 414/227, 266
See application file for complete search history.

(56) References Cited

U.S. PATENT DOCUMENTS
4,983,903 A * 1/1991 Bae et al. ............. 320/128
(Continued)

FOREIGN PATENT DOCUMENTS
JP    02-254509 A    10/1990
(Continued)

OTHER PUBLICATIONS

Michel Gourgand, Choice of the Guide Path Layout for an AGV Based Material Handling System, 1995, IEEE.*

*Primary Examiner* — Drew A Dunn
*Assistant Examiner* — Nathaniel Pelton
(74) *Attorney, Agent, or Firm* — Kenyon & Kenyon LLP

(57) ABSTRACT

A method for managing charge of a plurality of battery-driven AGVs (automated guided vehicles) circulating on the main route provided with an automatic charge station includes: a first step of detecting, using an AGV, a marker for battery voltage check provided on a main route to measure the voltage of a battery of the AGV; a second step of changing the route of the AGV to advance it into a charge route provided in an automatic charge station, stopping the AGV in a charging position, and charging the battery automatically by using an automatic charger, if the measured battery voltage has lowered to a level requiring charging; and a third step of conveying the AGV that has been automatically charged to a standby place provided in the automatic charge station.

4 Claims, 5 Drawing Sheets

U.S. PATENT DOCUMENTS

| | | | |
|---|---|---|---|
| 5,239,931 A * | 8/1993 | Muselli et al. | 104/34 |
| 5,545,967 A * | 8/1996 | Osborne et al. | 320/109 |
| 6,094,028 A * | 7/2000 | Gu et al. | 320/109 |
| 6,498,454 B1 * | 12/2002 | Pinlam et al. | 320/107 |
| 7,193,394 B2 * | 3/2007 | Ueda et al. | 320/128 |
| 2002/0104726 A1 * | 8/2002 | Kuzuya | 191/6 |
| 2002/0145402 A1 * | 10/2002 | Ueda et al. | 320/104 |

FOREIGN PATENT DOCUMENTS

| | | | |
|---|---|---|---|
| JP | 3-111910 A | | 5/1991 |
| JP | 3-201011 A | | 9/1991 |
| JP | 5-11846 | * | 1/1993 |
| JP | 5-11846 A | | 1/1993 |
| JP | 6-83450 A | | 3/1994 |
| JP | 6-292303 A | | 10/1994 |
| JP | 8-101713 | * | 4/1996 |
| JP | 8-101713 A | | 4/1996 |
| JP | 2002-299412 A | | 10/2002 |

\* cited by examiner

FIG. 5

| ADDRESS | PROGRAM NUMBER | | | 127 |
|---|---|---|---|---|
| | 1 | 2 | 3 | |
| 1 | COMMAND 1 | COMMAND 1 (LEFT TURN) | | |
| 2 | COMMAND 2 | COMMAND 2 (CHARGE STOP) | | |
| 3 | COMMAND 3 (BATTERY VOLTAGE CHECK) | COMMAND 3 (START SPEED DESIGNATION) | | |
| -- | COMMAND 4 (DUMMY SWITCH) | COMMAND 4 (STANDBY PLACE STOP) | | |
| -- | COMMAND 5 | COMMAND 5 (TO COMMAND 5 OF PROGRAM NO. 1) | | |
| -- | COMMAND 6 | -- | | |
| -- | -- | -- | | |
| -- | -- | -- | | |
| 256 | | | | |

# METHOD AND SYSTEM FOR MANAGING CHARGE OF AUTOMATED GUIDED VEHICLE

This is a 371 national phase application of PCT/JP2008/072784 filed 15 Dec. 2008, claiming priority to Japanese Patent Application No. JP 2008-021430 filed 31 Jan. 2008, the contents of which are incorporated herein by reference.

FIELD OF THE INVENTION

The present invention relates to a method and a system for managing charge of automated guided vehicles with which charge of a battery serving as a power source of an automated guided vehicle (AGV) is automatically managed.

BACKGROUND OF THE INVENTION

As a technology of this kind, there has conventionally been an unmanned carrying device as disclosed in Patent Document 1.

This unmanned carrying device automatically manages charge of an AGV such that the AGV is stopped once at the entrance to a charge route on a main route, and if requiring to be charged, redirected to the charge route to be charged by an automatic charging device. The unmanned carrying device starts the fully-charged AGV to the main route (standby place) and makes the AGV stand by thereat.

Patent Document 1: Japanese Patent Application Publication No. JP-A-3-111910

SUMMARY OF THE INVENTION

Problem to be Solved by the Invention

In the related art mentioned above, it has been impossible to simplify the structure and construction thereof for making a centralized control device detect the request of the AGV requiring to be charged and controlling the AGV to the charging device. In addition, when the number of AGVs waiting to be charged or the number of fully-charged AGVs becomes large, they clog the entrance to the charge route, thus hampering smooth operation of the line using the AGVs to carry parts and the like.

Moreover, because charging takes a long time, there has been a constraint that the charging device can only be installed on a route for empty carriages with no load to carry.

The problem of the present invention is to provide a method and a system for managing charge of automated guided vehicles, in which: the structure and construction thereof for performing control to guide the AGV requiring to be charged to the charge route can be simplified; the main route and the charge route can always be managed so as to accommodate a fixed number of AGVs without delaying the conveyance along the main route even if the number of fully-charged AGVs is large, or on the contrary, zero, whereby smooth operation of the line is not hampered; there is no constraint on an installation position of a charge station; and thus simplification and a small space are achieved.

Means for Solving the Problem

The problem described above is solved by making the method and the system for managing charge of automated guided vehicles to have a structure of each aspect described below. This is only for facilitating understanding of the present invention, and should not be interpreted to mean that the technical characteristics and the combinations thereof described in this specification are limited to those described in the following items. In addition, if a plurality of matters are described in one item, the plurality of matters do not necessarily have to be employed together, but it is possible to employ only a part of the matters.

(1) A method for managing charge of automated guided vehicles manages charge of each of a plurality of automated guided vehicles circulating, driven by power of a battery, on a loop-shaped main route provided with an automatic charge station therein. The method is characterized by including a first step of detecting, using the automated guided vehicle, a marker for battery voltage check provided in a desired position on the main route to measure the voltage of the battery built into the automated guided vehicle; a second step of changing the route of the automated guided vehicle to advance it into a charge route provided in the automatic charge station, stopping the automated guided vehicle in a predetermined charging position, and charging the battery of the automated guided vehicle automatically by using an automatic charger, if the battery voltage measured in the first step has lowered to a level requiring charging; and a third step of conveying the automated guided vehicle that has been automatically charged in the second step to a fully-charged AGV standby place the automated guided vehicle with charged battery provided in the automatic charge station to make the automated guided vehicle stand by at the standby place, and restoring the automated guided vehicle with charged battery that is waiting at the standby place back to the main route. Further, the automatic charge station is provided with the plurality of automatic chargers, and in the second step, the automated guided vehicle that has changed the route so as to advance into the charge route is adapted to stop at the charging position of the automatic charger that is not in use among the plurality of the automatic chargers, whereby the battery of the automated guided vehicle is automatically charged with the unused automatic charger. Still further, in the third step, in case that the automated guided vehicle with charged battery is not placed at the standby place, and there are the plurality of the automated guided vehicles during charge at the plurality of automatic chargers, the automated guided vehicles that need more time for charge than the others will advance first.

In the third step, the automated guided vehicle that has been automatically charged in the second step is conveyed to the fully-charged AGV standby place the automated guided vehicle with charged battery provided in the automatic charge station so as to stand by at the standby place, and the automated guided vehicle with charged battery that is waiting at the standby place is restored back to the main route. In this step, the order of the operations has no preference between conveying the automated guided vehicle with charged battery to the standby place and restoring the automated guided vehicle with charged battery waiting at the standby place back to the main route.

(2) The method for managing charge of automated guided vehicles according to item (1), characterized in that, in the third step, in case that there is none of the automated guided vehicles with charged batteries waiting at the standby place, the automated guided vehicles while being in automatic charge in the second step are restored back to the main route without being waited at the standby place.

According to the invention described in this item, the number of the AGVs on the main route can be ensured, and the number of the AGVs in the charge station reduced.

(3) A system for managing charge of automated guided vehicles that manages charge of each of a plurality of automated guided vehicles circulating, driven by power of a battery, on a loop-shaped main route provided with an automatic charge station, where the system is characterized in that the system includes a marker for battery voltage check that is optionally detected by the automated guided vehicle while traveling along the main route; the automatic charge station includes a charge route branching from the main route, forming a loop, and returning to the main route, the charge route having therein an automatic charger that automatically charges the battery of the automated guided vehicle that has advanced into the charge route and stopped in a predetermined charging position, and a standby place in which the automated guided vehicle with charged battery stands by between the automatic charger and a return port to the main route; the automated guided vehicle includes battery voltage measuring device that measures the voltage of the battery built into the automated guided vehicle by detecting the marker; the system further includes a control device that, if the battery voltage measured by the battery voltage measuring device has lowered to a level requiring charging, changes the route of the automated guided vehicle to advance it into the charge route provided in the automatic charge station, stops the automated guided vehicle in the charging position, conveys the automated guided vehicle that has been automatically charged to the standby place, makes the automated guided vehicle stand by at the standby place, and restores the automated guided vehicle with charged battery that is waiting at the standby place back to the main route; the automatic charge station is provided with the plurality of automatic chargers; and the control device makes the automated guided vehicle that has changed the route so as to advance into the charge route to stop at the charging position of the automatic chargers that are not in use among the plurality of automatic chargers so that the batteries of the automated guided vehicles are automatically charged with the unused automatic chargers, and in case that the automated guided vehicle with charged battery is not placed at the standby place, and there are the plurality of the automated guided vehicles during charge at the plurality of automatic chargers, the automated guided vehicles that need more time for charge than the others will advance first.

According to the invention described in this item, the order of the operations has no preference between conveying the automated guided vehicle that has been automatically charged to the standby place of the automated guided vehicle with charged battery for standby and restoring the automated guided vehicle with charged battery waiting at the standby place back to the main route.

(4) The system for managing charge of automated guided vehicles according to item (3), characterized in that, in the control device, in case that there is none of the automated guided vehicles with charged batteries waiting at the standby place, the automated guided vehicles during charge are restored back to the main route without being waited at the standby place.

According to the invention described in this item, it is possible to provide the system for managing charge of AGVs that will enhance efficiency of automatically charging the batteries of the AGVs and ensure the number of the AGVs on the main route.

(5) The method for managing charge of automated guided vehicles according to item 1 or 2, characterized in that the automated guided vehicle is of a tractor type optionally separated from or connected to a conveying carriage, and the automated guided vehicle is separated from the conveying carriage when advanced by changing a route from the main route into the charge route, and the automated guided vehicle to be restored back to the main route is connected to the conveying carriage left on the main route and returned to normal travel along the main route.

(6) The system for managing charge of automated guided vehicles according to item 3 or 4, characterized in that the automated guided vehicle is of a tractor type optionally separated from or connected to a conveying carriage, and the automated guided vehicle is separated from the conveying carriage when advanced by changing a route from the main route into the charge route, and the automated guided vehicle to be restored back to the main route is connected to the conveying carriage left on the main route and returned to normal travel along the main route.

Effects of the Invention

According to the present invention, the automatic charge station can be provided anywhere on the main route only by adding one marker for battery voltage check on the main route, and the structure and construction thereof for performing control to guide the AGV requiring to be charged to the charge route can be simplified. In addition, the main route and the charge route can always be managed so as to accommodate a fixed number of vehicles without delaying the conveyance along the main route even if the number of fully-charged AGVs is large, or on the contrary, zero. Therefore, smooth operation of the line is not hampered. Moreover, by making highly efficient use of the automatic charger in the automatic charge station, it is possible to provide a method and a system for managing charge of automated guided vehicles that can reduce the cost of equipment and the space.

BRIEF DESCRIPTION OF THE DRAWINGS

FIG. 5 is a diagram showing an outline of contents of a program in the form of a table.

DESCRIPTION OF THE REFERENCE NUMERALS

Figure 1:
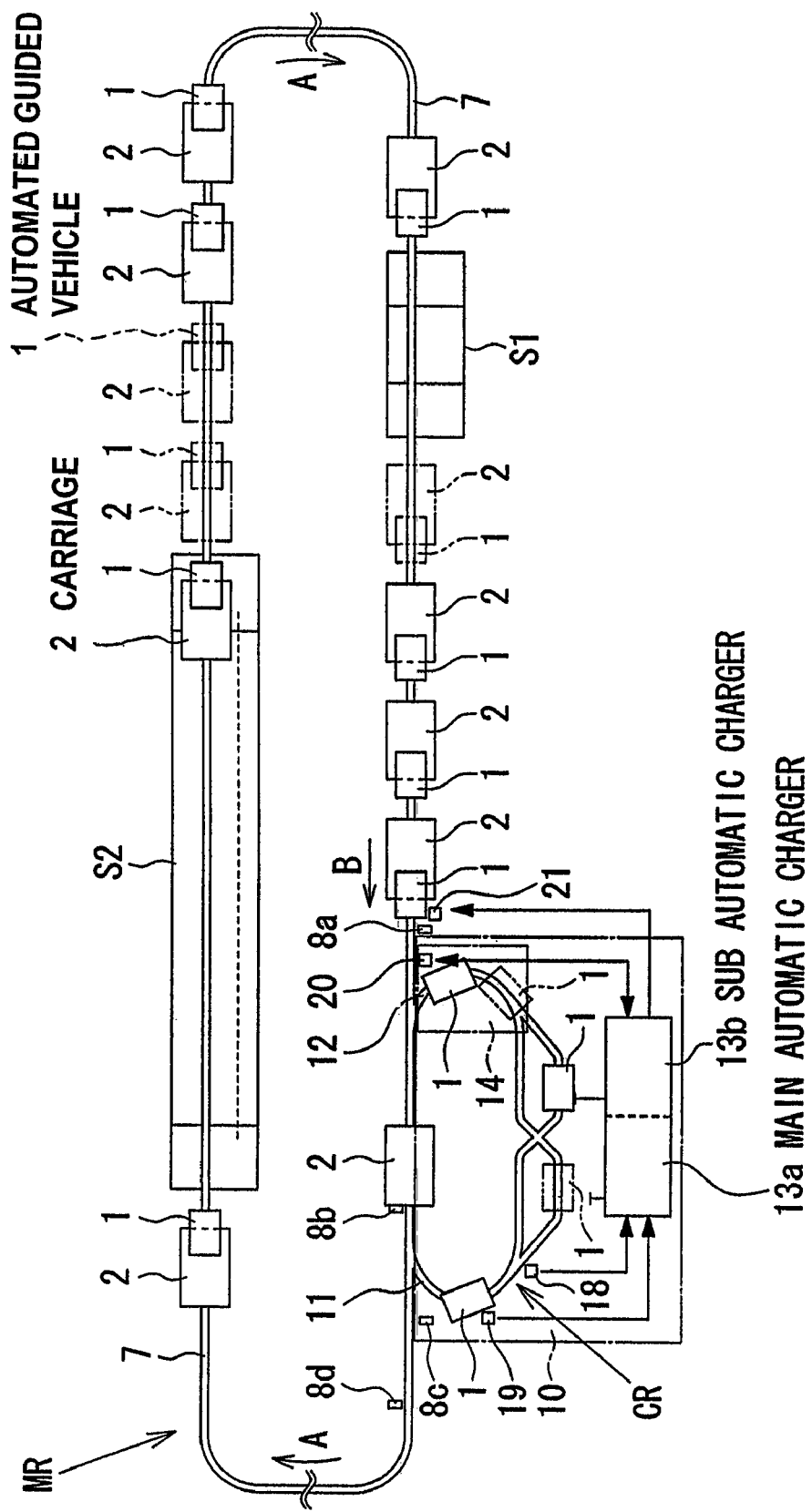
FIG. 1 is a diagram showing an embodiment of a charging system for AGVs according to the present invention along with a production line.

1: AGV (automated guided vehicle), 3: Battery, 8a: Marker (marker for battery voltage check), 9: Battery voltage measuring circuit (AGV control section), 10: Automatic charge station, 13: Automatic charger, 14: Fully-charged AGV standby place, MR: Main route, CR: Charge route.

DETAILED DESCRIPTION

An embodiment of the present invention will be described below based on the accompanying drawings. Note that, among the drawings, the same reference numerals indicate the same or corresponding parts.

Figure 2:
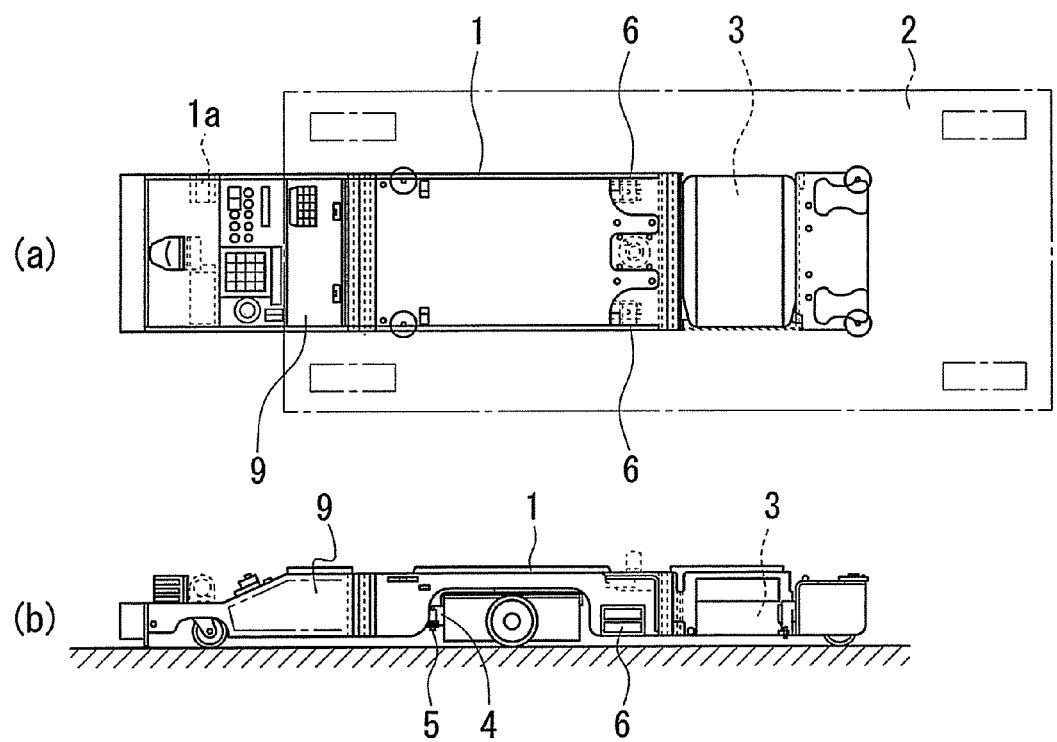
FIG. 2 shows overall structural views of the AGV.
Figure 3:
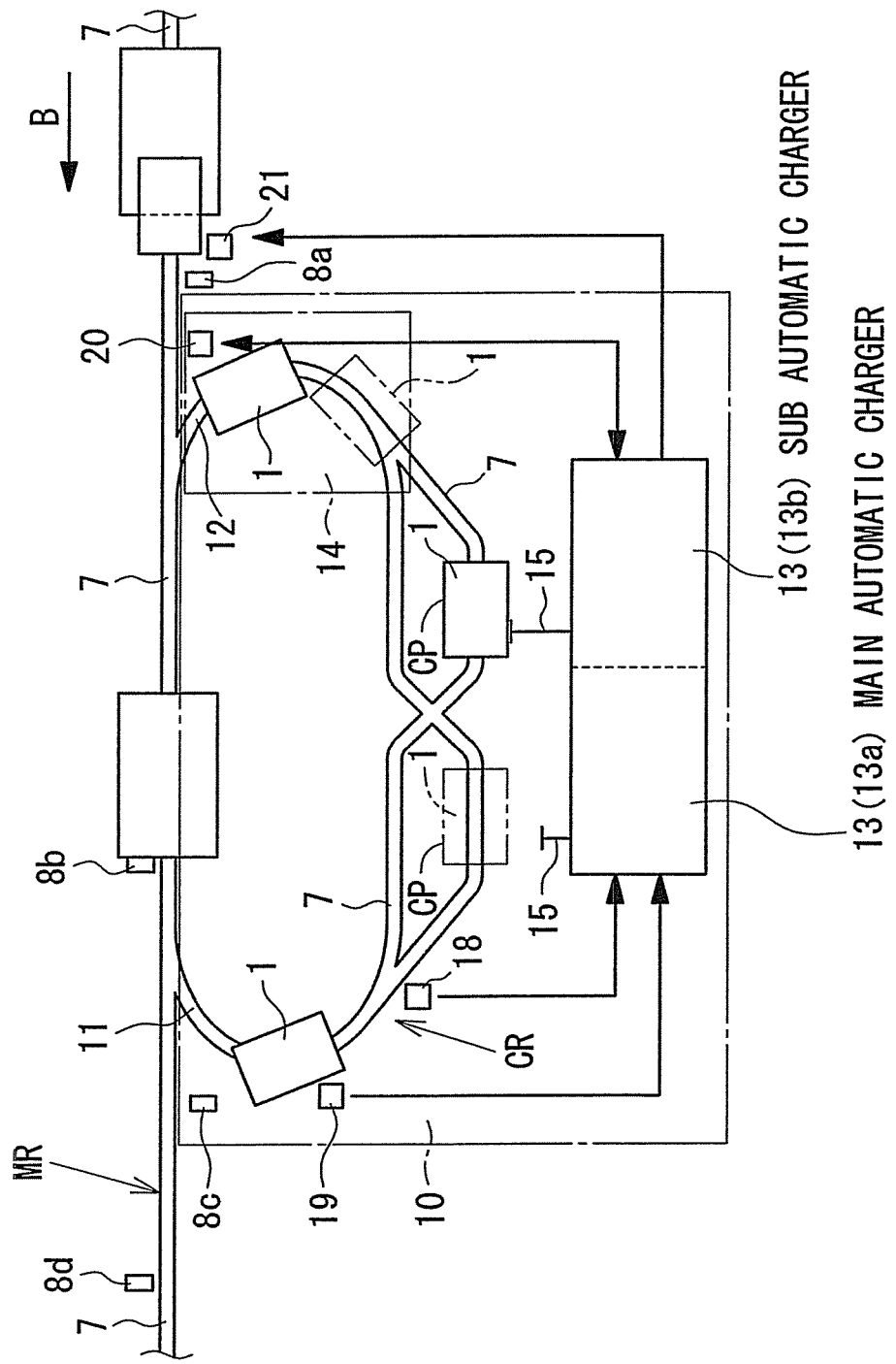
FIG. 3 is an enlarged cut-out view of FIG. 1 showing the charging system for AGVs.

FIG. 1 is a diagram showing an embodiment of a charging system for automated guided vehicles according to the present invention along with a production line; FIG. 2 shows overall structural views of the automated guided vehicle; and FIG. 3 is an enlarged cut-out view of FIG. 1 showing the charging system for automated guided vehicles.

As shown in FIG. 1, an AGV 1 is an automated guided vehicle circulating, driven by power of a battery, through a loop-shaped main route MR formed corresponding to a shape of the production line. The AGV 1 circulates in the direction of an arrow A in the example shown. FIG. 1 illustrates a plurality of such AGVs 1 each of which tows a loaded conveying carriage (hereinafter called carriage for short) 2.

In FIG. 1, S1 illustrates a preparation operation process section, and S2 illustrates an assembly operation process section. Each of the sections S1 and S2 is composed of a plurality of small sections.

As shown in a plan view of FIG. 2A and a left side view of FIG. 2B, each of the AGVs 1 has a travel magnetic tape detection sensor 4, a magnetic marker detection sensor 5, and a charge terminal 6, as well as a battery 3 for driving the AGV.

Here, the travel magnetic tape detection sensor 4 is a sensor that detects the magnetism of a travel magnetic tape 7 guiding the travel of the AGV 1, which travels in the extending direction of the travel magnetic tape 7 while checking the position of the travel magnetic tape 7 with the travel magnetic tape detection sensor 4. The travel magnetic tape 7 is laid in accordance with the main route MR and a charge route CR to be described in detail later. Accordingly, the AGV 1 travels in accordance with the main route MR and the charge route CR.

The magnetic marker detection sensor 5 is a sensor provided for detecting the magnetism of magnetic markers 8 provided at predetermined places on the main route MR and the charge route CR, and counting up the execution address of a travel program installed in the AGV 1.

The charge terminal 6 is a terminal for charging the battery 3 built into the AGV 1, and provided on a side face of the AGV 1.

Note that, although FIGS. 1 and 3 show an example in which four (8a to 8d) of the magnetic markers 8 are provided, the number thereof is obviously not limited to four.

In FIGS. 1 and 3, the magnetic marker 8a has a function to command a voltage check of the battery 3 of the AGV 1. The magnetic marker 8b has a function to make the AGV (AGV requiring to be charged) 1 turn to the left from the forward direction (direction of an arrow B) of travel, that is, to make the AGV 1 advance (change the route) into the charge route CR, if the voltage of the battery 3 detected by the magnetic marker 8a, that is, checked by the commend issued at a predetermined certain address of the travel program, has lowered to a level requiring charging. If the checked voltage of the battery 3 is higher than the level requiring charging, the magnetic marker 8b serves as a dummy marker to make the AGV 1 travel straight ahead, that is, to make the AGV 1 travel as usual.

Although not shown, the magnetic markers 8 are also provided in a charging position and a fully-charged AGV standby place to be described in detail later, and the magnetic marker detection sensor 5 detects the magnetic markers 8 to count up the execution address of the travel program installed in the AGV 1, thereby issuing various control commands to various parts of the AGV 1. FIG. 5 illustrates an outline of a content of the travel program in the form of a table.

Each of the AGVs 1 also has an optical communication device 1a and a battery voltage measuring circuit (AGV control section) 9 that checks the battery voltage by detecting the magnetic marker 8a provided with the function to command the voltage check of the battery 3.

As shown in FIGS. 1 and 3, an automatic charge station 10 is provided in an appropriate place in the main route MR, and the automatic charge station 10 is provided with the charge route CR branching from the main route MR, forming a loop, and returning to the main route MR. An entrance from the main route MR to the charge route CR is denoted as an entry port 11, and an exit from the charge route CR to the main route MR is denoted as a return port 12.

Provided in the charge route CR are an automatic charger 13 that automatically charges the battery 3 of the AGV 1 that has entered into the charge route CR and stopped in a charging position CP, and a standby place (fully-charged AGV standby place) 14 in which the AGV 1 with charged battery stands by between the automatic charger 13 and the return port 12 to the main route MR.

In the present embodiment, the automatic charger 13 is provided as two units, a main automatic charger 13a and a sub automatic charger 13b, and is configured so that, when the one automatic charger 13a (or 13b) is busy, the other (vacant) automatic charger 13b (or 13a) that is not busy is used.

Figure 4:
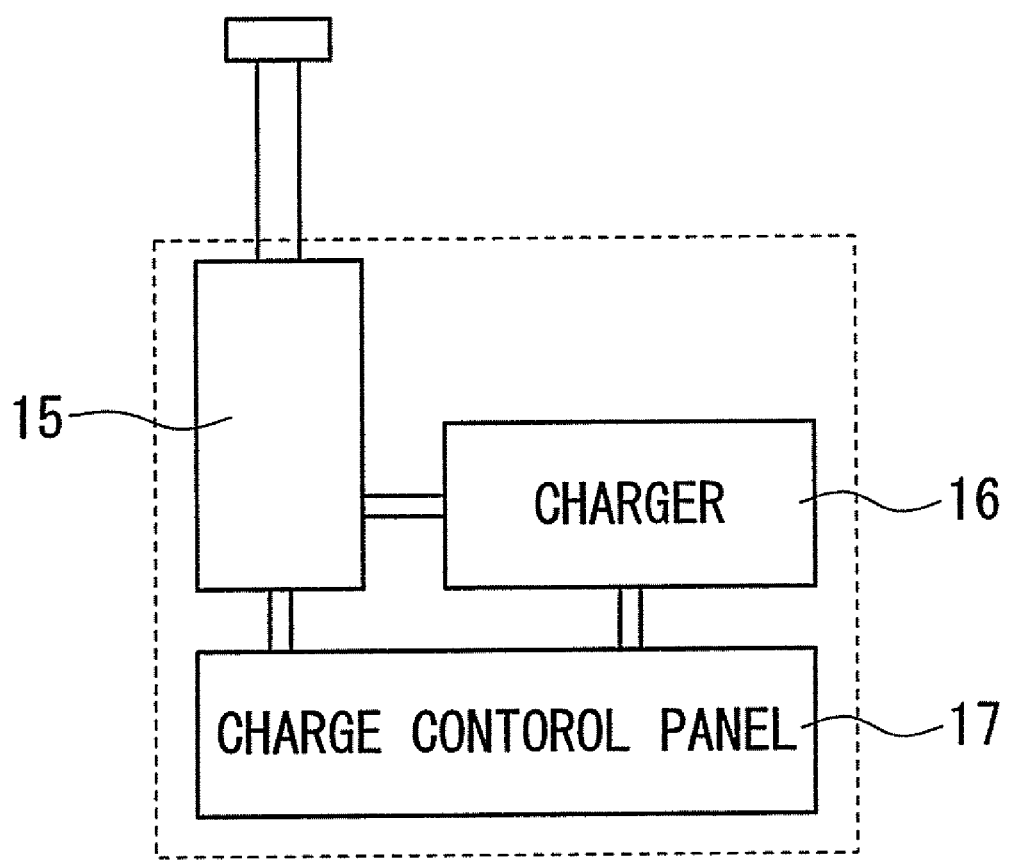
FIG. 4 is a block diagram of an automatic charger shown in FIG. 3.

Each of the automatic chargers 13 is provided with a charge electrode unit 15, a charger 16, and a charge control panel 17, as shown in FIG. 4. As shown in the enlarged view of FIG. 3, each of the automatic chargers 13 is configured so as to automatically charge the battery 3 built into the AGV by pressing the stretchable charge electrode unit 15 so as to contact the charge terminal 6 (refer to FIG. 2) of the AGV 1 after the AGV 1 has stopped at the charging position CP of the automatic charge station 10.

Here, the charger 16 is a charge circuit unit constituting the main body of the automatic charger, and the charge control panel 17 is a control panel that controls the charge electrode unit 15 and the charger 16 in order to perform the automatic charge.

The automatic chargers 13 are also provided with optical communication devices 18 to 21. In this case, the optical communication devices 18 to 21 are located in the vicinity of a branch route toward the automatic charger 13 to be used, in the vicinity of the entry port 11, and in the vicinity of the return port 12 on the charge route CR, and in the vicinity of a point on the main route MR just before the charge route CR.

The optical communication device 1a (refer to FIG. 2) of the AGV 1 communicates with the communication devices 18 to 21 connected to the charge control panels 17 of the automatic chargers 13.

The AGV 1 and the automatic chargers 13 communicate with each other to exchange information on control, status check, and the like of each unit, for example, on execution and switching of programs controlling the start, stop, and traveling of the AGV 1, on confirmation of passage by registration confirmation from the AGV 1 that has been forced to start, and on checking of status such as "being charged." Then, charge management of the AGV 1 to be described later is performed by the AGV control section 9 composed of the travel program, an arithmetic control unit, and others that are mounted on the AGV 1, and by the charge control panels 17 of the automatic chargers 13.

Next, operation of the embodiment will be described.

The operation will be described in the case in which the AGV 1 performs continuous circulation operation while towing the carriage 2.

After the AGV 1 towing the carriage 2 has passed by the magnetic marker 8a provided on the main route MR, the AGV 1 automatically checks the voltage of the battery 3 thereof, and if a voltage drop (that the voltage has lowered to a predetermined level requiring charging) is confirmed as a result of the check, switches the execution program from No. 1 to No. 2 to execute the program No. 2 from Address 1 (refer to FIG. 5). That is, the AGV 1 changes the route (turns to the left) by detecting the next magnetic marker 8b, and enters the automatic charge station 10.

At this time, in the case of a tractor type AGV 1 as illustrated in the figure, the AGV 1 alone advances toward the automatic charge station 10, leaving the carriage 2 carrying the load on the main route MR. The automatic charge station 10 is provided on the main route MR with empty carriages with no load in the case that the AGV 1 is of a conventionally used integrated carrier type because the loaded AGV 1 cannot be left in the automatic charge station 10 for a long time. However, the automatic charge station 10 can be provided in any position on the main route MR in the case of the tractor type AGV 1 of the present embodiment.

Then, on the way after branching off the main route MR toward the charge route CR (automatic charge station 10), the optical communication device 19 confirms passage of the AGV 1 in a contactless manner, and sends a confirmation signal of passage of the AGV requiring to be charged to the control panel 17 of the automatic chargers 13.

When receiving the confirmation signal of passage of AGV requiring to be charged, the automatic charger 13 subsequently sends a command to start the fully-charged AGV 1 to the fully-charged AGV standby place. In the fully-charged AGV standby place, the optical communication device 20 checks whether there is any of the waiting AGVs (fully-charged AGVs in the fully-charged AGV standby place) 1, and if any, starts the fully-charged AGV 1. This is for the purpose of keeping the number of the AGVs 1 on the main route MR constant.

The fully-charged AGV 1 thus started returns to the main route MR, and tows the carriage 2 to restore the normal travel. The optical communication device 20 confirms that the fully-charged AGV 1 has passed, thus completing a process to restore the normal travel (to maintain the number of vehicles).

Because no AGV 1 can be started if none of the AGVs 1 is waiting in the fully-charged AGV standby place, the AGV 1 currently being charged by the automatic charger 13, or the AGV 1 that has been charged for the longest time if both of the two automatic chargers 13a and 13b are charging the AGVs 1, is forced to start.

The AGV 1 that has newly entered the automatic charge station 10 receives, using the optical communication device 1a (refer to FIG. 2), a non-charging signal from the optical communication device 18 of the unused automatic charger (vacant automatic charger) 13, and makes a pit stop in the charging position CP on the side of the vacant automatic charger 13. Then, the automatic charge to the built-in battery 3 is started by mutual signal control (communication devices are not shown) between the AGV 1 and the automatic charger 13. After the automatic charge is completed, the AGV 1 is started to the fully-charged AGV standby place.

As described above, if none of the AGVs 1 is waiting in the fully-charged AGV standby place, the AGV 1 that has been charged for the longest time by either of the two automatic chargers 13a and 13b is forced to start.

That is, if no confirmation of start is obtained by the optical communication device 20 even though a start command has been issued to the waiting AGV 1, a forced start command is issued to the AGV 1 that has made a pit stop earlier or the AGV 1 that has made a pit stop at the automatic charger 13 (charging position CP) whose charge time counter has recorded a longer elapsed time.

Although the fully-charged AGV 1 is normally sent out to the main route MR, the AGV 1 that has been forced to start returns to the automatic charge station 10 in a relatively short time because the AGV 1 that has been forced to start is not a fully-charged AGV 1. However, because a plurality (two in the present embodiment) of such automatic chargers 13 are provided, non-charging of the AGV 1 does not occur even if the forced start as described above is subsequently repeated. Thus, the AGV 1 that has been forced to start can travel although it is a short period of time.

The related art employs a system in which the fully-charged AGV 1 is sent out to the main route MR. As a result, the numbers of the automatic chargers 13 and the waiting AGVs 1 at the automatic charge station 10 become large to increase the occupying space and equipment cost of the automatic chargers 13 and the waiting AGVs 1. However, in the present embodiment, by forcing the incompletely charged AGV 1 to start, all of the batteries 3 including the batteries 3 of the AGVs 1 on the main route MR are operated in an equalized consumption state as a whole. Accordingly, the numbers of the automatic chargers 13 and the AGVs 1 can be reduced even though the number of charges may increase, and by operating the automatic chargers 13 at full capacity, the automatic charge can be performed with higher efficiency without affecting the operation of this system.

When the main route MR becomes in a non-operating state, the automatic charger 13 confirms the non-operating state by using a calendar timer or the like, and a forced charge command is issued via the automatic charger 13 and the optical communication device 21 to the AGV 1 in the vicinity of the magnetic marker 8a for battery voltage check provided in a position just before the entrance to the automatic charge station 10 (the return port 12 from the charge rout CR).

The AGV 1 that has received the forced charge command receives the automatic charge (forced charge) by performing the same behavior (travel) as in the case that the battery voltage has lowered to a level requiring charging. After becoming in the completely charged (full charge) state, the AGV 1 starts toward the fully-charged AGV standby place 14 to stand by at the standby place 14. After the charge by the forced charge command as described above is completed, the automatic charger 13 issues a forced charge command via the optical communication device 21 to the next AGV 1 that has reached the vicinity of the magnetic marker 8a.

In the present embodiment, the charge route CR is managed to have three of the AGVs 1 constantly. Accordingly, by repeating the forced charge command and the forced charge three times in the non-operating state, the AGV 1 (AGV 1 without a voltage drop to a level requiring charging) just before the entrance to the automatic charge station 10 can be fully charged without changing the order of the carried loads on the main route MR.

In the present embodiment described above, the marker 8a for battery voltage check is added in the main route MR. The AGV 1 checks the voltage of the battery 3 thereof each time passing by the marker 8a. Then, if the voltage has lowered to a level requiring charging, the AGV 1 is separated from the carriage 2 (leaving the carried load), and the AGV 1 alone is redirected to the charge route CR, that is, to the automatic charge station 10.

Then, after the AGV 1 advances toward the automatic charge station 10, the AGV 1 in the fully-charged AGV standby place 14 is returned to the main route MR in order to compensate for the shortage of the number of the AGVs 1 on the main route MR, and connected to the carriage 2 left on the main route MR. Then, the AGV 1 tows the carriage 2, thus returning to the normal travel on the main route MR.

In this way, only by adding one marker 8a on the main route MR, the automatic charge station 10 can be provided anywhere on the main route MR.

In addition, there is no constraint that the charging device (automatic charge station) be installed in a position for empty carriages on the main route, as in the case of the related art.

Moreover, there is no need of a number of the various AGVs 1 that stand by at the fully-charged AGV standby place meeting the need for diversified products.

Furthermore, effects can be obtained that, for example, the main route MR and the charge route CR can always be managed so as to accommodate a fixed number of vehicles, and a stable operation can be achieved regardless of the state of charge.

Normally, in the embodiment, after the automatic charger 13 has completed charging, the AGV 1 is started to enter and stand by in the fully-charged AGV standby place, and the AGV 1 in the fully-charged AGV standby place is returned to the main route MR. If none of the AGVs 1 is waiting in the fully-charged AGV standby place, the AGV 1 currently being charged is forced to start so as to ensure the number of the AGVs 1 on the main route MR.

During non-operating time, by issuing the forced charge command to the AGV 1 in the vicinity of the marker 8a for battery voltage check by using the calendar timer or the like, the AGV 1 on the main route MR (consuming the battery) can be directed to the charge route CR, that is, to the automatic charge station 10 so as to be charged automatically.

In this way, a plurality of such AGVs 1 in the midway of charging can travel on the main route MR, although it is for a short period of time. By charging the next AGV 1 in that period, the batteries 3 of all of the AGVs 1 can be used in an equalized manner, thus realizing a highly efficient charging system making the maximum use of the automatic charger 13.

Even if the AGVs 1 requiring to be charged successively enter the charge station, the forced start is applied to the first AGV 1 in the order of the pit stop or to the AGV 1 with the longest charge time as a result of checking the charge time counter, and the AGV 1 thus started is returned to the main route MR, because the automatic chargers 13 are provided as the two main and sub automatic chargers 13a and 13b. Therefore, there is no possibility of occurrence of defect in running characteristics such as meandering, or stoppage of the AGV 1.

During non-operating time, it is possible to issue the forced charge command via the automatic charger 13 and the optical communication device 21, return the fully-charged AGV 1 in the automatic charge station 10 to the main route MR, and charge the AGV 1 just before the entrance to the automatic charge station 10. This enables restoration of the battery voltage of the group of AGVs 1 that has lowered as a whole, without changing the order of the carried loads on the main route MR.

Note that, although the tape using magnetism, the markers, and the sensors are used in the embodiment described above, the present invention is not limited to this. Also, the communication between the AGV and the automatic charger is not limited to optical communication.

The invention claimed is:

1. A method for managing charge of automated guided vehicles that manages charge of each of a plurality of automated guided vehicles circulating, driven by power of a battery, on a loop-shaped main route provided with an automatic charge station therein, the method comprising:
   a first step of detecting, using the automated guided vehicle, a marker for battery voltage check provided in a desired position on the main route to measure the voltage of the battery built into the automated guided vehicle;
   a second step of changing the route of the automated guided vehicle to advance it into a charge route provided in the automatic charge station, stopping the automated guided vehicle in a predetermined charging position, and charging the battery of the automated guided vehicle automatically by using an automatic charger, if the battery voltage measured in the first step has lowered to a level requiring charging; and
   a third step of conveying the automated guided vehicle that has been automatically charged in the second step to a fully-charged automated guided vehicle stand-by place, the automated guided vehicle with charged battery provided in the automatic charge station, to make the automated guided vehicle stand by at the standby place, and restoring the automated guided vehicle with charged battery that is waiting at the standby place back to the main route,
   wherein the automatic charge station is provided with the plurality of automatic chargers;
   in the second step, the automated guided vehicle that has changed the route so as to advance into the charge route is adapted to stop at the charging position of the automatic chargers that are not in use among the plurality of the automatic chargers, so that battery of the automated guided vehicle is automatically charged with the unused automatic charger; and
   in the third step, in case that the automated guided vehicle with charged battery is not placed at the standby place, and there are the plurality of the automated guided vehicles during charge at the plurality of automatic chargers, the automated guided vehicles that need more time for charge than the others will advance first, and
   wherein the automated guided vehicle is of a tractor type optionally separated from or connected to a conveying carriage, and the automated guided vehicle is separated from the conveying carriage when advanced by changing a route from the main route into the charge route, and
   the automated guided vehicle to be restored back to the main route is connected to the conveying carriage left on the main route and returned to normal travel along the main route.

2. The method for managing charge of automated guided vehicles according to claim 1, wherein the automated guided vehicle currently being automatically charged in the second step is restored back to the main route without making the automated guided vehicle stand by at the standby place, if no automated guided vehicle with charged battery is waiting at the standby place in the third step.

3. A system for managing charge of automated guided vehicles that manages charge of each of a plurality of automated guided vehicles circulating, driven by power of a battery, on a loop-shaped main route provided with an automatic charge station therein, wherein:
   the system comprises a marker for battery voltage check that is optionally detected by the automated guided vehicle while traveling along the main route;
   the automatic charge station comprises a charge route branching from the main route, forming a loop, and returning to the main route, the charge route having therein an automatic charger that automatically charges the battery of the automated guided vehicle that has advanced into the charge route and stopped in a predetermined charging position, and a standby place in which the automated guided vehicle with charged battery stands by between the automatic charger and a return port to the main route;
   the automated guided vehicle comprises a battery voltage measuring device that measures the voltage of the battery built into the automated guided vehicle by detecting the marker;
   the system further comprises a control device that, if the battery voltage measured by the battery voltage measuring device has lowered to a level requiring charging, changes the route of the automated guided vehicle to advance it into the charge route provided in the automatic charge station, stops the automated guided vehicle in the charging position, conveys the automated guided vehicle that has been automatically charged to the standby place, makes the automated guided vehicle stand by at the standby place, and restores the automated guided vehicle with charged battery that is waiting at the standby place back to the main route;

the automatic charge station is provided with the plurality of automatic chargers;

the control device makes the automated guided vehicle that has changed the route so as to advance into the charge route to stop at the charging position of the automatic chargers that are not in use among the plurality of the automatic chargers so that the batteries of the automated guided vehicles are automatically charged with the unused automatic chargers, and in case that the automated guided vehicle with charged battery is not placed at the standby place, and there are the plurality of the automated guided vehicles during charge at the plurality of automatic chargers, the automated guided vehicles that need more time for charge than the others will advance first;

the automated guided vehicle is of a tractor type optionally separated from or connected to a conveying carriage, and the automated guided vehicle is separated from the conveying carriage when advanced by changing a route from the main route into the charge route; and the automated guided vehicle to be restored back to the main route is connected to the conveying carriage left on the main route and returned to normal travel along the main route.

4. The system for managing charge of automated guided vehicles according to claim 3, wherein the control device restores the automated guided vehicle currently being charged back to the main route without making the automated guided vehicle stand by at the standby place, if no automated guided vehicle with charged battery is waiting at the standby place.

* * * * *